(12) United States Patent
Yoshida et al.

(10) Patent No.: US 12,010,433 B2
(45) Date of Patent: Jun. 11, 2024

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Akimitsu Yoshida, Tokyo (JP); Hideki Kadoi, Tokyo (JP); Gou Yamashita, Kanagawa (JP); Nobukazu Yoshida, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 200 days.

(21) Appl. No.: 17/467,345

(22) Filed: Sep. 6, 2021

(65) Prior Publication Data

US 2021/0400192 A1 Dec. 23, 2021

Related U.S. Application Data

(63) Continuation of application No. PCT/JP2020/010859, filed on Mar. 12, 2020.

(30) Foreign Application Priority Data

Mar. 15, 2019 (JP) .................................. 2019-049006
Mar. 15, 2019 (JP) .................................. 2019-049142

(51) Int. Cl.
*H04N 23/80* (2023.01)
*H04N 1/00* (2006.01)
(Continued)

(52) U.S. Cl.
CPC .......... *H04N 23/80* (2023.01); *H04N 1/00453* (2013.01); *H04N 1/32128* (2013.01);
(Continued)

(58) Field of Classification Search
CPC .......... H04N 1/32128; H04N 2201/3226–323; H04N 2201/3242; H04N 2201/3247;
(Continued)

(56) References Cited

U.S. PATENT DOCUMENTS 8,194,993 B1 * 6/2012 Chen ...................... G06T 5/002
382/254
10,699,393 B2 6/2020 Shohara
(Continued)

FOREIGN PATENT DOCUMENTS

JP 2012-094978 A 5/2012
JP 2016-119693 A 6/2016
(Continued)

OTHER PUBLICATIONS

International Search Report of International Application No. PCT/JP2020/010859 dated Jun. 2, 2020.

*Primary Examiner* — Paul M Berardesca
(74) *Attorney, Agent, or Firm* — Cowan, Liebowitz & Latman, P.C.

(57) ABSTRACT

An image processing apparatus includes a composition unit configured to composite a plurality of captured images to generate a composite image, a recording control unit configured to record the captured images or the composite image as a recorded image in a recording unit, and a determination unit configured to determine an imaging mode or a method of composition performed by the composition unit, in which the recording control unit records type data determined on the basis of a result of the determination in association with the recorded image that is captured or composited according to the imaging mode or the method of composition determined by the determination unit.

12 Claims, 7 Drawing Sheets

(51) Int. Cl.
*H04N 1/32* (2006.01)
*H04N 5/265* (2006.01)
*H04N 7/015* (2006.01)
*H04N 23/63* (2023.01)
*H04N 23/667* (2023.01)
*H04N 23/698* (2023.01)
*H04N 23/741* (2023.01)
*H04N 23/951* (2023.01)
*H04N 101/00* (2006.01)
*H04N 23/67* (2023.01)
*H04N 23/68* (2023.01)

(52) U.S. Cl.
CPC ............. *H04N 5/265* (2013.01); *H04N 7/015* (2013.01); *H04N 23/63* (2023.01); *H04N 23/667* (2023.01); *H04N 23/741* (2023.01); *H04N 23/951* (2023.01); *H04N 23/676* (2023.01); *H04N 23/6845* (2023.01); *H04N 23/698* (2023.01); *H04N 2101/00* (2013.01); *H04N 2201/0084* (2013.01); *H04N 2201/3242* (2013.01); *H04N 2201/3247* (2013.01); *H04N 2201/325* (2013.01); *H04N 2201/3252* (2013.01)

(58) Field of Classification Search
CPC ........... H04N 2201/3252; H04N 5/265; H04N 5/765; H04N 5/77; H04N 5/772; H04N 5/775; H04N 23/667; H04N 23/80; H04N 23/676; H04N 23/6845; H04N 23/698; H04N 23/741; H04N 23/743; H04N 23/951; H04N 25/58; H04N 25/583; H04N 25/587; H04N 25/589
See application file for complete search history.

(56) References Cited

U.S. PATENT DOCUMENTS

| | | | |
|---|---|---|---|
| 2013/0121525 A1* | 5/2013 | Chen | H04N 23/698 |
| | | | 382/305 |
| 2013/0124471 A1* | 5/2013 | Chen | H04N 23/90 |
| | | | 707/624 |
| 2017/0278263 A1* | 9/2017 | Tanaka | H04N 23/662 |
| 2020/0364912 A1* | 11/2020 | Tsuihiji | G06T 11/60 |
| 2021/0385370 A1* | 12/2021 | Kang | H04N 23/617 |

FOREIGN PATENT DOCUMENTS

| | | |
|---|---|---|
| JP | 2017-175507 A | 9/2017 |
| JP | 2018-014651 A | 1/2018 |
| JP | 2019-029954 A | 2/2019 |
| JP | 2019-033308 A | 2/2019 |
| WO | 2017/104395 A1 | 6/2017 |

* cited by examiner

IMAGE PROCESSING APPARATUS, IMAGE PROCESSING METHOD, AND STORAGE MEDIUM

BACKGROUND OF THE INVENTION

Field of the Invention

The present invention relates to an image processing apparatus and the like capable of compositing a plurality of images or reproducing a composite image.

Description of the Related Art

An imaging apparatus such as a digital camera or a mobile terminal with a camera may add imaging conditions and the like to attribute information of image data obtained through imaging and record the image data as one image file. Japanese Patent Laid-Open No. 2012-094978 discloses a technique in which, when composite image data obtained from multiple exposure imaging for compositing a plurality of images during the imaging is recorded, a multiple exposure frequencies are recorded in a file header as metadata. In Japanese Patent Laid-Open No. 2012-094978, it is determined whether or not the image data is from an image that has been obtained through multiple exposure imaging by using the multiple exposure frequencies.

However, in the above existing technique, it is only possible to identify whether or not an image has been captured in an imaging mode involving one composition process called multiple exposure imaging. No consideration is given to images generated in an imaging mode involving various composition processes or generated through various composition process sequences, or general-purpose incidental information for identifying attribute information of the images.

An object of the present invention is to provide an image processing apparatus capable of appropriately determining and processing an image according to the presence or absence or the type of composition process.

SUMMARY OF THE INVENTION

In order to solve the problem, according to an aspect of the present invention, there is provided an image processing apparatus including a composition unit for compositing a plurality of captured images to generate a composite image;

a recording control unit for recording the captured images or the composite image as a recorded image in a recording unit; and a determination unit for determining an imaging mode or a method of composition performed by the composition unit, in which the recording control unit records type data determined on the basis of a result of the determination in association with the recorded image that is captured or composited according to the imaging mode or the method of composition determined by the determination unit.

Further features of the present invention will become apparent from the following description of exemplary embodiments with reference to the attached drawings.

DESCRIPTION OF THE EMBODIMENTS

Hereinafter, an Embodiment of the present invention will be described with reference to the drawings. An example of an imaging apparatus will be described as an image processing apparatus related to the Embodiment of the present invention. However, the image processing apparatus includes a general-purpose image processing apparatus (hereinafter, referred to as a PC) such as a personal computer, a digital camera, a digital movie camera, and the like. The image processing apparatus of the present invention may be applied to any apparatus that can display a list of image files, such as a mobile phone, a smartphone, a so-called tablet terminal, and a car navigation apparatus, and includes product forms thereof.

Figure 1:
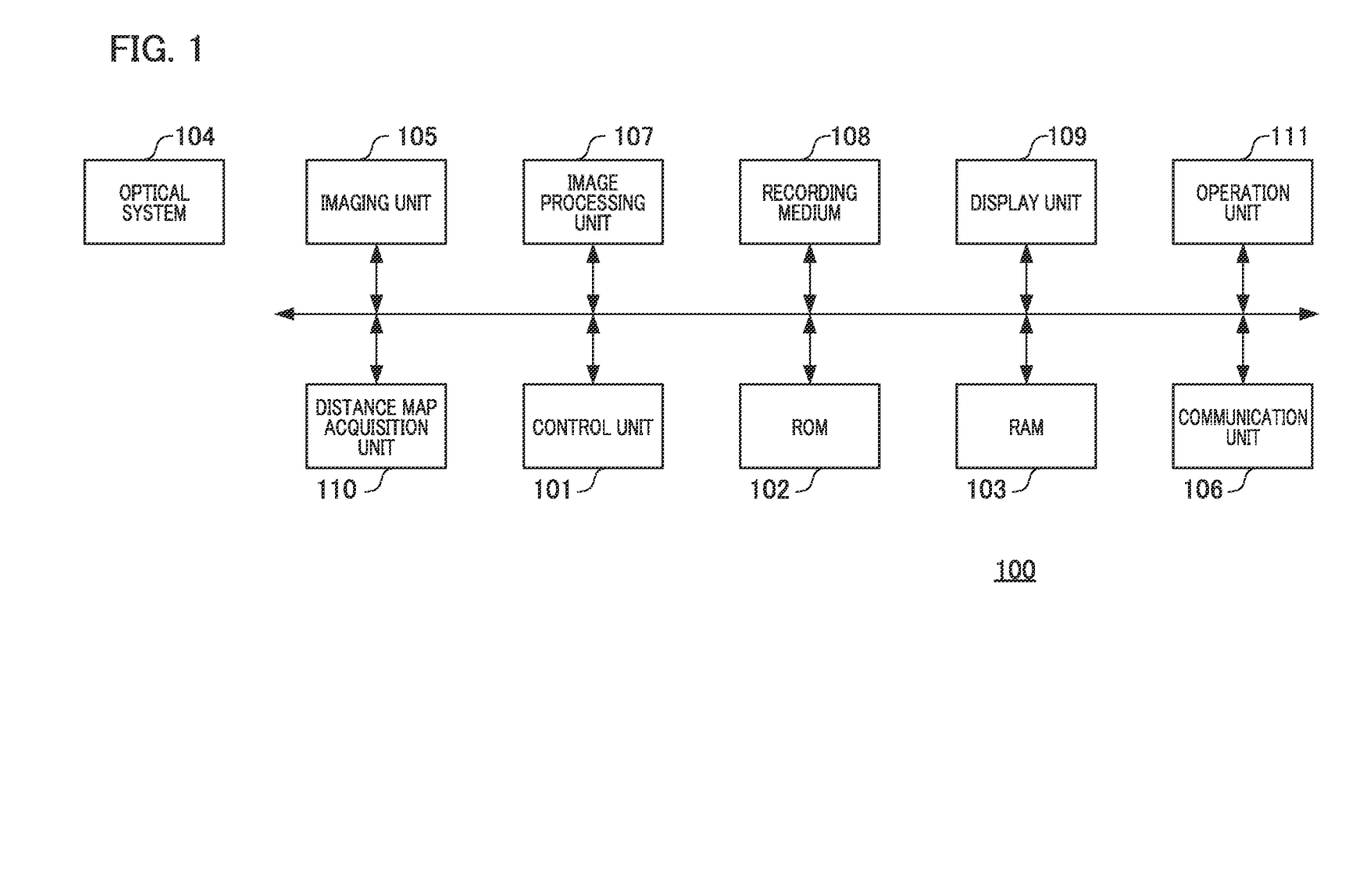
FIG. 1 is a block diagram of an image processing apparatus of the present Embodiment.

FIG. 1 is a block diagram illustrating a functional configuration of an imaging apparatus 100 as an example of an image processing apparatus of the present Embodiment. A control unit 101 includes a central processing unit (CPU) as a computer, and functions as a control unit for controlling the entire imaging apparatus.

The control unit 101 reads a computer program for operating each constituent of the imaging apparatus 100 from a read only memory (ROM) 102 as a storage medium, loads the computer program to a random access memory (RAM) 103, and executes the computer program.

The ROM 102 is a rewritable nonvolatile memory, and stores parameters and the like required for an operation of each constituent of the imaging apparatus 100 in addition to an operation program executed by the CPU. The RAM 103 is a rewritable volatile memory, and is used as a region that temporarily stores data that is output through an operation of each constituent of the imaging apparatus 100.

An imaging optical system 104 includes lenses, diaphragms, and a drive unit that drives such optical members, and forms an image of light from a subject in an imaging unit 105. The imaging unit 105 includes an imaging element such as a charge coupled device (CCD) image sensor or a complementary metal-oxide semiconductor (CMOS) image sensor. The imaging element functions as an imaging unit for performing photoelectric conversion on an optical image formed by the imaging optical system 104 to form an analog image signal and generating a captured image.

The analog image signal is converted into digital image data through analog/digital (A/D) conversion in an A/D converter of the imaging unit 105, and the digital image data is stored in the RAM 103. In the present Embodiment, the imaging unit is included in the image processing apparatus, but the image processing apparatus may not include the imaging unit.

An image processing unit 107 applies various image processes such as white balance adjustment, color interpolation, reduction/enlargement, and filtering on the image data stored in the RAM 103.

A recording medium 108 is a memory card or the like that is detachably attached to the imaging apparatus 100, and functions as a recording unit that records the image data stored in the RAM 103. The control unit 101 also functions as a recording control unit for recording the captured image or the composite image on the recording medium 108 as a recorded image. Image data processed by the image processing unit 107, image data subjected to A/D conversion in the imaging unit 105, and the like are recorded on the recording medium 108 as recorded image data. The image processing unit 107 performs a process of compositing a plurality of pieces of image data that are obtained through the imaging and are output from the imaging unit 105, according to a method based on an imaging mode that is preset during the imaging in the imaging unit 105.

For example, the control unit 101 gives an instruction to the image processing unit 107 according to a signal indicating an imaging mode that is set by a user by using an operation unit 111 or an imaging mode defined on the basis of an imaging scene that is determined (acquired) from an image by the control unit 101 during imaging. A composition process corresponding to the imaging mode is performed in response to the instruction. The control unit 101 determines type data indicating the type of image related to composition by determining (acquiring) the imaging mode at this time, and records the determined type data on the recording medium 108 in association with image data of the composite image obtained through the composition process in the image processing unit 107.

For example, in the present Embodiment, an image file in which at least part of header information is configured in accordance with a general-purpose standard (Exif standard) is generated. The type data is recorded in a data region conforming to the standard of the header information, and thus the image data recorded in an image data section in the image file and the type data are associated with each other.

The image processing unit 107 performs a composition process on a plurality of pieces of input image data on the basis of an instruction from the control unit 101. In this case, at least some of the data that is a composition target may be data read from the ROM 102 or the recording medium 108.

The image processing unit 107 composites the plurality of pieces of image data recorded on the ROM 102 or the recording medium 108 during reproduction thereof according to a composition process method set by the user by using the operation unit 111. Each imaging mode and a composition process corresponding thereto or various composition processes during reproduction will be described later.

A display unit 109 includes a display device such as a liquid crystal display (LCD), and performs through-image display on a captured image acquired by the imaging unit 105 or the like. The display unit 109 displays data such as text or images or a so-called graphical user interface such as a menu.

A distance map acquisition unit 110 acquires information regarding a distance distribution of a subject by creating the information as a distance map, for example, according to a time of flight (TOF) method or by using a stereo camera.

Data regarding an image shift amount distribution or a defocus amount distribution between images having parallax related to the distance map or the captured image indicates a distribution of depth information in a depth direction of a subject. Hereinafter, the data indicating a distribution of depth information will be referred to as distance map data. The acquired distance map data is stored as digital data in the RAM 103. There are many well-known map data generation methods, and any thereof may be used.

The operation unit 111 includes buttons, a dial, a touch panel, a slide bar, and the like as various physical operation members, and outputs an instruction signal to the control unit 101 or the like by receiving the user's operation.

A communication unit 106 is a wireless LAN interface or the like for performing communication with external apparatuses, but may employ any type of interface such as a wired LAN interface or a USB interface as long as the interface can perform communication with external apparatuses. An image file may be transmitted and received to and from an external apparatus (for example, a PC or a smartphone) via the communication unit 106.

(Data Structure of Image File)

Figure 2:
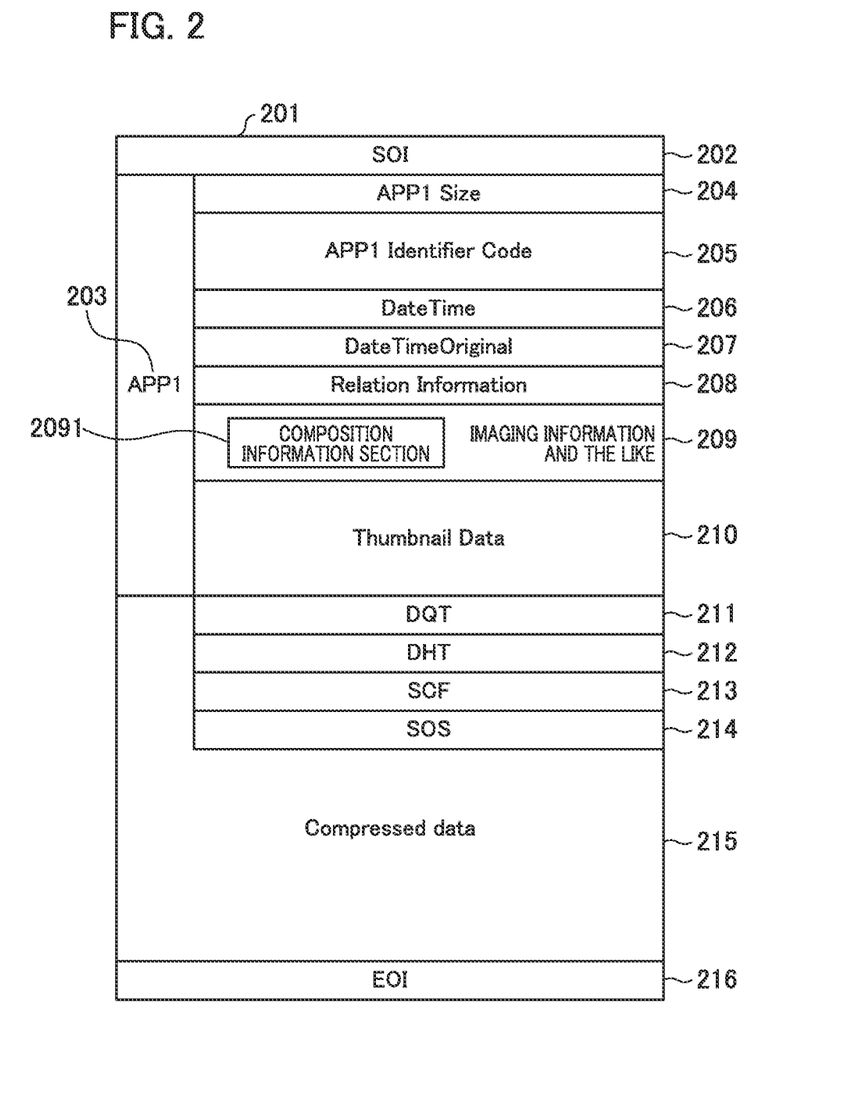
FIG. 2 is a diagram illustrating an example of a data structure of an image data file.

FIG. 2 illustrates a data structure of an image file generated and managed by the imaging apparatus 100.

In the present Embodiment, a file format based on the Exif standard is assumed to be employed. An image data file 201 is, for example, generated during imaging in the imaging unit 105, acquired via the communication unit 106, or stored in the recording medium 108 or the ROM 102. When the imaging apparatus 100 processes the image data file 201, the image data file 201 may be temporarily copied to the RAM 103.

The image data file 201 has a marker SOI (202) indicating the start of an image at the head thereof, and then has an application marker APP1 (203) (APP1 region) as a header region.

The application marker APP1 (203) includes a size of APP1 (204), an identification code of APP1 (205), DateTime (206) indicating the date and time at which the image was created, DateTimeOriginal (207) indicating the date and time when the image data was generated, RelationInformation (208) indicating a relation between images, imaging information and the like (209), and a thumbnail image (210).

The imaging date-and-time information stored in the RAM 103 is stored in the DateTime (206) and the DateTimeOriginal (207). The RelationInformation (208) provides predetermined information indicating that there is a relation between, for example, a plurality of captured images to be composited. The predetermined information may be an image number of a related image that is initially recorded, and may be information indicating a specific imaging mode.

The imaging information and the like (209) includes, for example, the imaging date and time, imaging parameters (an exposure time, an aperture value, an ISO sensitivity, a focal length, and the presence or absence of an auxiliary light source), and a composition information section 2091 related to the present Embodiment. The composition information section 2091 stores composition related information that is generated and processed in the present Embodiment.

The present recorded image data includes a quantization table DQT (211), a Huffman table DHT (212), a frame start marker SOF (213), a scan start marker (214), and an image data section 215 in which compressed data is stored, and is terminated with a marker EOI (216) indicating the end of the image data.

The file structure shown in the present Embodiment matches the structure of the Exif standard, and is thus compatible with the Exif standard. However, a recording structure for various information such as composition information of the present Embodiment is not necessarily limited to the structure of the Exif standard. For example, the image may be recorded in a file different from the image data file 201, and may be recorded in a special database included in the imaging apparatus 100.

Figure 3:
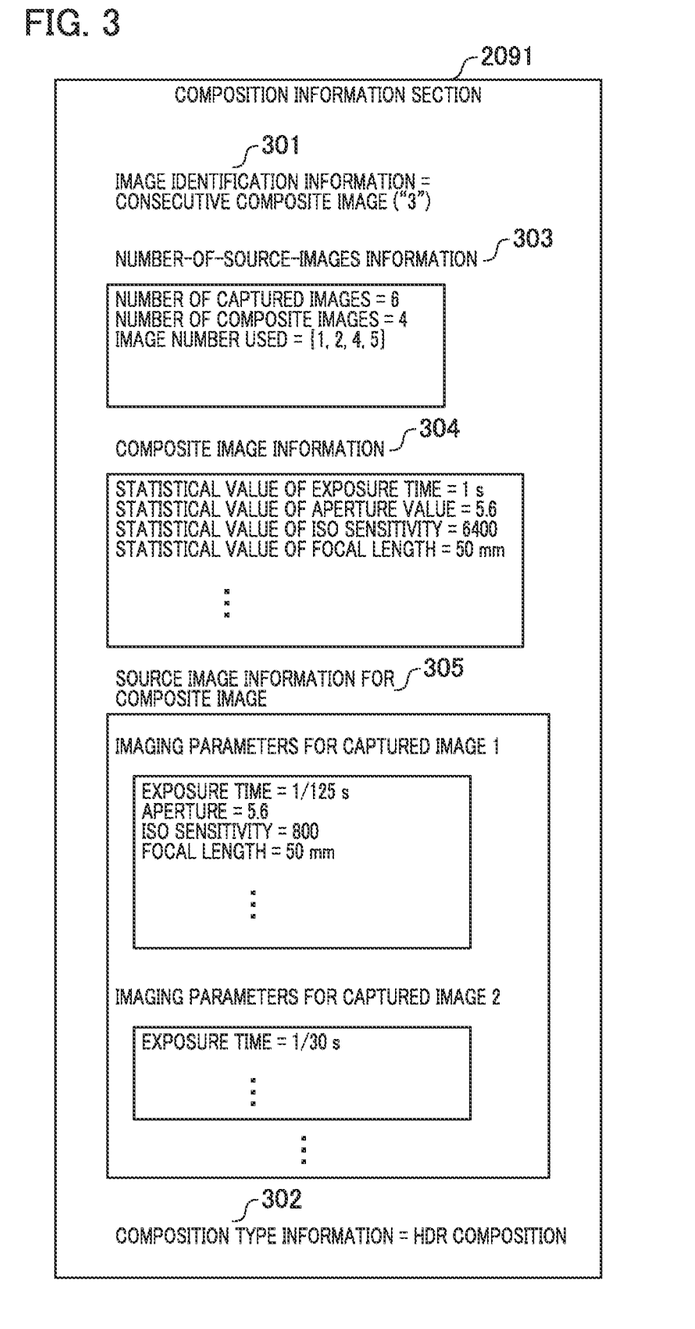
FIG. 3 is a diagram illustrating an example of a data structure of a composite information section.

FIG. 3 illustrates an example of information stored in the composition information section 2091. In the present Embodiment, the image processing unit 107 in the rear stage, an application of an external apparatus, a network server, or the like records various information related to the present composition in order to perform optimization of a composition process, recovery, learning using AI, or the like on the basis of the present composite image and information related to the present composite image. At least some of the information is stored in a general-purpose Exif region, and can be referred to by a general-purpose application since compatibility with various apparatuses conforming to Exif can be obtained.

Respective regions in which image identification information 301, composition type information 302, the number-of-source-images information 303 for a composite image, composite image information 304, and source image information 305 for the composite image are written are disposed in the composition information section 2091.

The image identification information 301 is type data generally indicating the type of image related to composition, and stores any one of pieces of classification information such as "non-composite image", a "general composite image", and a "composite image acquired during imaging".

The "composite image acquired during imaging" is an image composited from simply a series of a plurality of source images (provisional recorded images) acquired from an imaging sensor during imaging (all of the images are not necessarily used). The "composite image acquired during imaging" is a classification assigned to a composite image in which imaging conditions (an aperture value, a subject distance, a light source, a lens focal length, and the like) and a subject range (imaging visual field) when all source images are acquired can be regarded as substantially constant.

"3" is assigned as the first type data to the "composite image acquired during imaging". The "general composite image" is a classification assigned to a composite image composited from a plurality of captured images (source images), and a composition method is not limited. "2" is assigned as the second type data to the "general composite image".

The "non-composite image" is a classification assigned to an image that cannot be regarded as a composite image classified into the "general composite image" and the "composite image acquired during imaging", for example, an image that is considered not to be composited. "1" is assigned as the type data to the "non-composite image". A value other than any of the above "1" to "3" may be prepared and used as the image identification information 301. For example, in a case where it is unclear which classification is to be assigned, "0" may be assigned as the type data.

(Each Composition Mode and Classification Thereof)

Next, an example will be described in which the image identification information 301 is assigned to an image obtained by involving composition processes in various imaging modes or a composite image obtained through various composition processes during reproduction.

In the present Embodiment, as described above, in a case where imaging conditions and an angle of view for a plurality of images used for composition during imaging are substantially identical, "3" is generated as the first type data.

In a case where one of the imaging conditions and the angle of view for the plurality of images used for composition is substantially different, "2" is generated as the second type data. In the case of non-composition, "1" is generated as the third type data.

For example, there is a mode in which high dynamic range (HDR) composition is performed during imaging as one of the types of composition of a multi-shot system (an imaging mode involving a plurality of times of imaging at different timings or with different imaging optical systems will be hereinafter referred to as a multi-shot system). In the HDR composition mode during imaging, among a plurality of source images, there is an image in which an imaging condition such as ISO or a shutter speed cannot be regarded as constant. Therefore, "2" that is the second type data is assigned as the image identification information.

In the HDR composition mode during imaging, among the plurality of source images, an image in which the imaging conditions other than ISO or a shutter speed are regarded as substantially constant may be assigned with "3" that is the first type data as the image identification information. Here, the HDR composition mode during imaging is a mode in which, for example, a plurality of images having different exposures (ISO, a shutter speed, and the like) are captured, the respective images are developed with different gammas, and development results are composited. The HDR composition mode during imaging is a mode in which appropriate images are extracted and composited from a plurality of images having different exposure conditions according to brightness values of the images.

Even when HDR processing is performed by an image processing apparatus or a PC application during reproduction (HDR composition mode during reproduction) as one of the types of multi-shot system composition, "2" that is the second type is assigned as the image identification information. This is because images are not composited during imaging. This is also because there is an image in which an imaging condition such as ISO or a shutter speed cannot be regarded as constant among a plurality of source images. Here, the HDR processing performed by an image processing apparatus, a PC application, or the like during reproduction is a process in which, for example, each of images selected by a user is developed with gamma according to an exposure difference and development results are composited.

In the same manner as described, "2" is assigned as the image identification information to a case of a composite image obtained in an HDR painting-like imaging mode in which HDR painting-like imaging is performed as one of the types of multi-shot system composition. The HDR painting-like imaging is a mode in which a composite image having a painting-like atmosphere is generated by performing gradation processing from a plurality of images having different exposures (ISO, a shutter speed, and the like).

As one of the types of composition, also in a case of a composite image obtained in an imaging mode in which a plurality of images are captured and a composite image is generated in order to achieve a multi-shot noise reduction function, "2" is assigned as the image identification information. This is because the imaging conditions can be regarded as constant, but the function is based on handheld imaging, and an angle of view of each captured image may differ due to camera shake or the like, and thus the angle of view cannot be regarded as constant.

It is considered that an angle of view (a range of a subject, or an imaging visual field) and imaging conditions can be regarded as substantially constant in the imaging mode in which a plurality of images are captured and a composite image is generated in order to achieve a multi-shot noise reduction function. Therefore, "3" may be assigned as the image identification information. The multi-shot reduction function is an imaging mode in which a plurality of images captured under the same imaging conditions are aligned on the basis of a detected shake amount and then composited to obtain a composite image with reduced noise, and is used in a case where a subject is dark and has a lot of noise.

"2" is also assigned as the image identification information in a case of a composite image obtained in a handheld night view imaging mode on the premise that a night view is imaged a plurality of times without a strobe in handheld imaging. This is also because the imaging conditions are constant, but the function is a function based on handheld imaging, and an angle of view of each captured image may differ due to camera shake, and the angle of view cannot be regarded as constant.

However, in a case of a composite image obtained in the handheld night view imaging mode, it is considered that an angle of view (a range of a subject or an imaging visual field) and imaging conditions can be regarded as substantially constant, and "3" may be assigned as the image identification information.

As one of the types of composition, in a case where imaging of a night view with a strobe and imaging without a strobe are consecutively performed in handheld imaging, "2" is assigned as the image identification information. This is because the function is a function based on handheld imaging, and an angle of view cannot be regarded as constant. This is also because there are captured images in which a condition related to a "light source" is changed among the imaging conditions.

However, when there is a hand-held night view strobe, "3" may be assigned as the image identification information in order not to be confused with "no hand-held night view strobe" by changing the way of assigning the image identification information. Then, in principle, "3" may be assigned as the image identification information to an image of a night view captured with a strobe in handheld imaging.

Next, a case of so-called creative filter type imaging will be described. The creative filter type imaging is an imaging mode in which a captured image is recorded by applying a special image processing effect thereto.

The types of imaging modes at the time of imaging include so-called rough monochrome imaging, soft focus imaging, diorama-style imaging, toy camera imaging, oil painting-style imaging, watercolor-style imaging, fisheye-style imaging, skin equality imaging, background blur imaging, and the like, and, in this case, "1" is assigned as the image identification information.

"1" is also assigned as the image identification information to an image obtained in an editing mode (application) in which image processing equivalent to image processing performed on an image captured in such a mode is applied to an image during reproduction. The reason for assigning "1" is that some image processing performed in the imaging mode or the editing mode (application) involves a mode of compositing images, but the image processing is not a composition process using a plurality of captured images (source images).

The rough monochrome imaging is imaging in which one image is captured, random noise is superimposed on the captured image, and monochrome processing is performed to produce an effect similar to that of a monochrome film. The soft focus imaging is imaging in which, for example, one image is captured and an image obtained by applying a low pass filter (LPF) to the captured image and the original captured image are composited at a predetermined ratio.

In the diorama-style imaging, for example, one image is captured and an image obtained by applying an LPF to the captured image and the original captured image are composited in a partial region. In this mode, a part of the image is blurred to add an image effect as if an actual subject was captured as a diorama.

The toy camera imaging is imaging in which, for example, one image is captured and an image effect is added as if the image was captured by a toy camera. Image processing performed in imaging using a toy camera is a process of, for example, reproducing a blurred photo effect by compositing an image to which an LPF is applied and an original image, or reproducing effects such as bright finishes, biased color tone, and peripheral dimming due to brightness and color conversion.

In the oil painting-style imaging, for example, one image is captured, the captured image is subjected to image processing and is composited with the original image to be subjected to image processing to make the image look like an oil painting.

In the watercolor-style imaging, for example, one image is captured, the captured image is subjected to image processing and is composited with the original image to be subjected to image processing to make the image look like a watercolor painting. In the fisheye-style imaging, for example, one image is captured, and the captured image is subjected to an effect as if the image was captured by compositing (interpolating) pixels such that each region has a fisheye lens-like distortion.

The skin equality imaging is an imaging mode in which the noise reduction (NR) of a skin-colored portion is strengthened to reduce the sense of resolution and smooth the texture of the skin. The background blur imaging is imaging in which, for example, two images are captured by changing an aperture value, a main subject and the background are separated from each other on the basis of a difference between the two images, and the background is blurred. In this case, a composition source image is one image, and a plurality of images are captured to determine a region to be blurred. In some cases, the background blur imaging may be realized by opening the diaphragm.

In date imprint imaging, date text data is superimposed on an image.

In a case of multiple-exposure imaging (multiple-composition mode) as one of the types of composition, "2" that is the second type data is assigned as the image identification information. This is because imaging conditions and an angle of view can be freely set by a user and thus cannot be regarded as constant. This is because a first image can be selected as a recorded image in a case of consecutive shooting priority.

However, in a case where the control unit 101 determines that imaging conditions and an angle of view for capturing a plurality of images can be regarded as constant, "3" that is the first type data is assigned as the image identification information. This is because there is a case where the imaging conditions are not changed due to the detection of tripod use or the like. In a case in which multiple exposure imaging (multiple composition mode) is performed on the premise of consecutive shooting, it can be regarded that an angle of view is constant and imaging conditions are substantially constant, and thus "3" that is the first type data may be assigned as the image identification information.

The multiple exposure imaging includes, for example, an addition mode, an addition averaging mode, a comparative bright mode, and a comparative dark mode. The addition mode is a mode in which a plurality of images are captured and RAW images are simply added together. The addition averaging mode is a mode in which a plurality of images are captured and RAW images are simply added and averaged. This is for improving S/N of, for example, a very dark image.

The comparative brightness mode is a mode of performing a comparative brightness composition process in which an image of which a pixel value at the same coordinate is not low is adopted when a plurality of images are captured and RAW images are composited.

The comparative dark mode is a mode of performing a comparative dark composition process in which an image of which a pixel value at the same coordinate is not high is adopted when a plurality of images are captured and RAW images are composited.

In a case of panoramic imaging, depth composition imaging, or starry sky portrait imaging as one of the types of composition, "2" is assigned as image identification information. This is because source images having different angles of view are composited.

In the panoramic imaging, a user pans a camera to capture images at a plurality of angles of view and composite the images. With this composition, a wide-angle image is generated by connecting a plurality of images captured at a plurality of different angles of view. The wide-angle image obtained through composition in the panoramic imaging includes an omnidirectional (360 degrees) image and the like.

In the case of the depth composition imaging or the starry sky portrait imaging, "3" may be assigned as the image identification information. This is because, in the case of depth composition imaging, since a focus is shaken, it can be regarded that an angle of view is substantially constant, and shooting conditions other than the focus are substantially constant. This is also because, even in the case of the starry sky portrait imaging, it can be regarded that an angle of view is substantially constant and imaging conditions other than the focus are substantially constant.

The depth composition imaging is imaging in which a plurality of images are captured by shaking a focus, regions in which the plurality of images are in focus are composited on the basis of a distance map or the like acquired by the distance map acquisition unit 110 to generate an image in which a depth is deeper than that in each image. The starry sky portrait imaging is imaging in which, after strobe imaging in which a strobe is made to emit light, for example, two images are consecutively captured without the strobe emitting light, and, for example, three images are composited.

As one of the types of composition, "3" is assigned as the image identification information in starry sky trajectory imaging. This is because an angle of view (a range of a subject, or an imaging visual field) and imaging conditions can be regarded as constant. The starry sky trajectory imaging is an imaging mode in which a plurality of images of starry sky are captured and comparatively brightly composited.

A case is considered in which the imaging unit 105 is, for example, a so-called laminated sensor in which the imaging element and the signal processing unit have an integrated multilayer structure.

In this case, even if there is image composition performed in the laminated sensor, it is conceivable that an output from the laminated sensor is one piece of image data of which a data format is almost the same as that of an image on which normal composition is not performed, and thus "1" is assigned as the image identification information.

However, in a case of such a form in which the control unit 101 can instruct the imaging unit 105 that is the laminated sensor, that is, the signal processing unit in the imaging unit 105 to perform a composition process, "2" is assigned as the image identification information to image data output from the imaging unit 105 in response to the composition instruction.

Alternatively, in a case where a plurality of images having identical imaging conditions are composited by using a memory of the laminated sensor in the laminated sensor, "3" may be assigned as the image identification information.

As one of the types of composition, there is an imaging mode called super-resolution imaging in which an image sensor or an imaging optical system is moved minutely to capture a plurality of images, and the images are composited to increase a resolution. In the case of this super-resolution imaging mode, since an imaging visual field cannot be regarded as constant because an image is captured with the angle of view shifted, "2" is assigned as the image identification information.

However, in the case of the super-resolution imaging, it can be regarded that an angle of view is substantially constant, and imaging conditions other than a focus are substantially constant, and thus "3" may be assigned as the image identification information.

The composition type information 302 is information indicating the types in which a composite image has been generated according to a composition process mode, a composition process, and composition conditions. The composition type information 302 stores at least one of pieces of information corresponding to the present image data on the basis of the type data corresponding to a plurality of types for composition such as the multiple exposure mode, the addition composition, the comparative bright composition, the HDR composition, and the panoramic composition as described above.

The number-of-source-images information 303 is information regarding the number of images acquired to generate image data of the image data file 201, and includes regarding the number of captured images (source images), the number of composited images indicating the number of source images used for a composite image, and an image number used. The number of captured images indicates a total number of images captured to generate the present image data. This includes, for example, the number of image data and the like that are not used for the composite image in the end because image quality deteriorates due to camera shake or the like.

The number of composited images indicates the number of images actually stored in the image data section 215 of the image data file 201 and used to generate the image data. The image number used is information in which image numbers that are counted in the number of composited images and are related to respective pieces of image data composited at the time of generation of the present image data are arranged.

In the composite image information 304, information regarding statistical values related to imaging conditions for images used for composition is recorded. In FIG. 3, the maximum value of an exposure time in an image used for the composition is recorded as the statistical value of the exposure time. As statistical values of an aperture value, an ISO sensitivity, and a focal length, an average value of aperture values of a plurality of images used for composition, an average value of ISO sensitivities, and an average value of focal lengths are recorded, respectively.

A statistical value related to each imaging condition recorded in the composite image information 304 is not limited to one type, and a plurality of types of any statistical values such as a maximum value, a minimum value, a total value, an average value, and a variance value may be recorded depending on the purpose of data collection or an application. In the present Embodiment, only the statistical values of the imaging parameters for the images used for composition are stored, but the present Embodiment is not limited to this, and one or more types of information regarding the above statistical values for images that are captured to generate the image data but are not used for composition may be stored.

The source image information 305 is information regarding imaging parameters of each image acquired to generate the image data of the image data file 201. Imaging parameters such as an exposure time, an aperture value, an ISO sensitivity, and a focal length are recorded in order for each captured image. Since such information is stored, it is possible to collect information regarding a composite image acquired by imaging a certain scene, that is, the number of images acquired to generate the composite image and imaging parameters for capturing the images.

(Overall Operation of Digital Camera)

Figure 4:
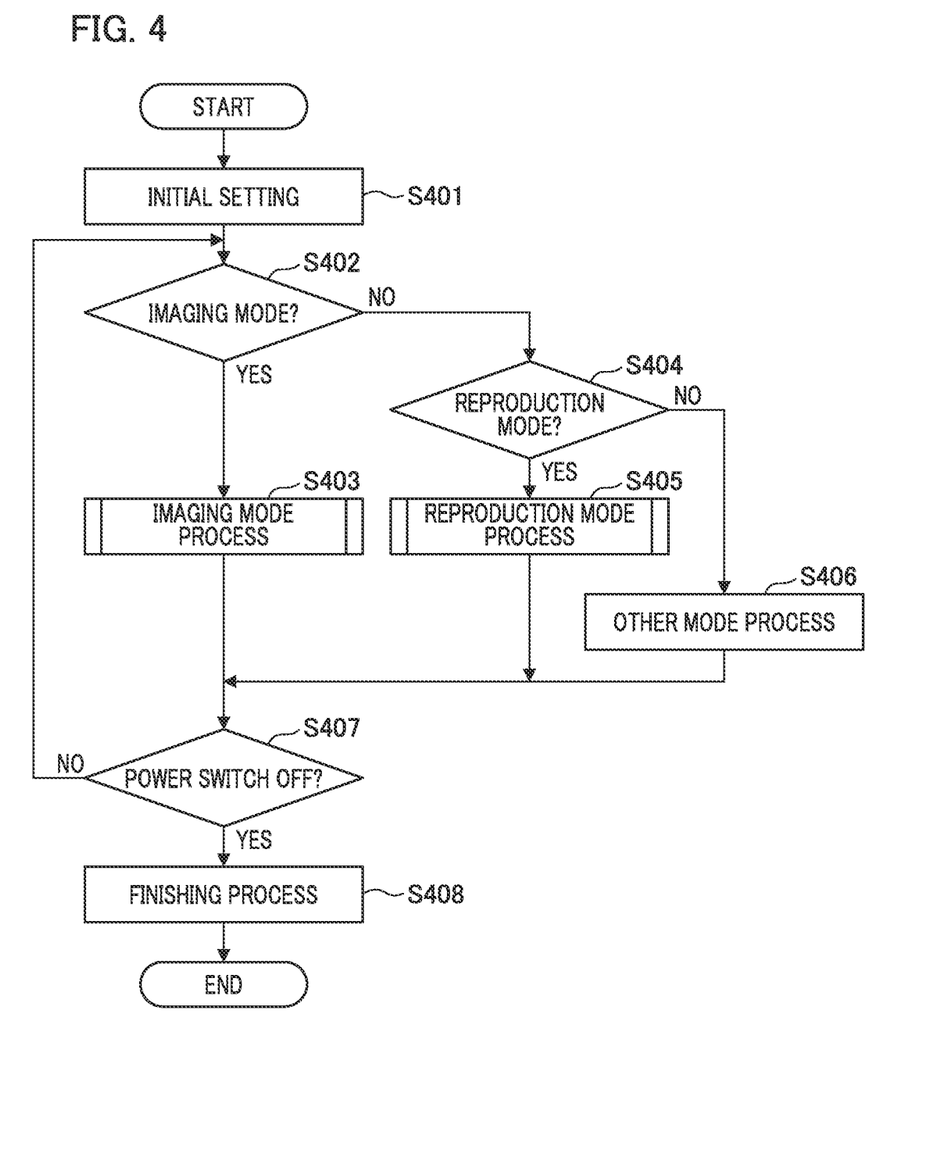
FIG. 4 is the entire flowchart in the image processing apparatus in an Embodiment.

Hereinafter, the overall operation of the imaging apparatus 100 of the present Embodiment will be described with reference to a flowchart for describing the overall operation of the imaging apparatus 100 of the present Embodiment in FIG. 4. The flowcharts shown below including FIG. 4 are realized by the control unit 101 reading the program stored in the ROM 102 and performing calculation processes or control.

(Overall Flow)

In step S401, when a power switch included in the operation unit 111 is operated by a user to be switched to power on, the control unit 101 initializes flags, control variables, and the like. Imaging mode information is acquired, and determination and setting are performed. In this case, when an imaging mode involving a composition process is set, setting information of the number N of images used for composition is also acquired, and determination and setting are performed.

In step S402, the control unit 101 determines a setting position of a mode switching switch included in the operation unit 111, proceeds to step S403 in a case where an imaging mode is set, and proceeds to steps S404 in a case where a mode other than the imaging mode is set. Details of an imaging mode process in step S403 will be described later.

In step S404, the control unit 101 determines whether the mode switching switch is set to a reproduction mode, proceeds to step S405 in a case where the reproduction mode is set, and proceeds to step S406 in a case where a mode other than the reproduction mode is set. Details of a reproduction mode process in step S405 will be described later. In step S406, the control unit 101 executes processes according to other selected modes, and proceeds to step S407 after the execution. The other modes include, for example, a communication mode for transmitting and receiving files stored in the recording medium 108.

In step S407, the control unit 101 determines a setting position of the power switch. In a case where the power switch is set to power on, the process returns to step S402, and in a case where the power switch is set to power off, the process proceeds to step S408. In step S408, the control unit 101 performs a predetermined finishing process.

The finishing process includes the following processes. That is, the control unit 101 changes the display of the display unit 109 to a finish state, closes a lens barrier, and protects the imaging unit 105. The control unit 101 records flags, parameters including control variables, setting values, and setting modes in a non-volatile memory or the like, and then powers off a portion that does not require the supply of power.

(Imaging/Recording Process)

Figure 5:
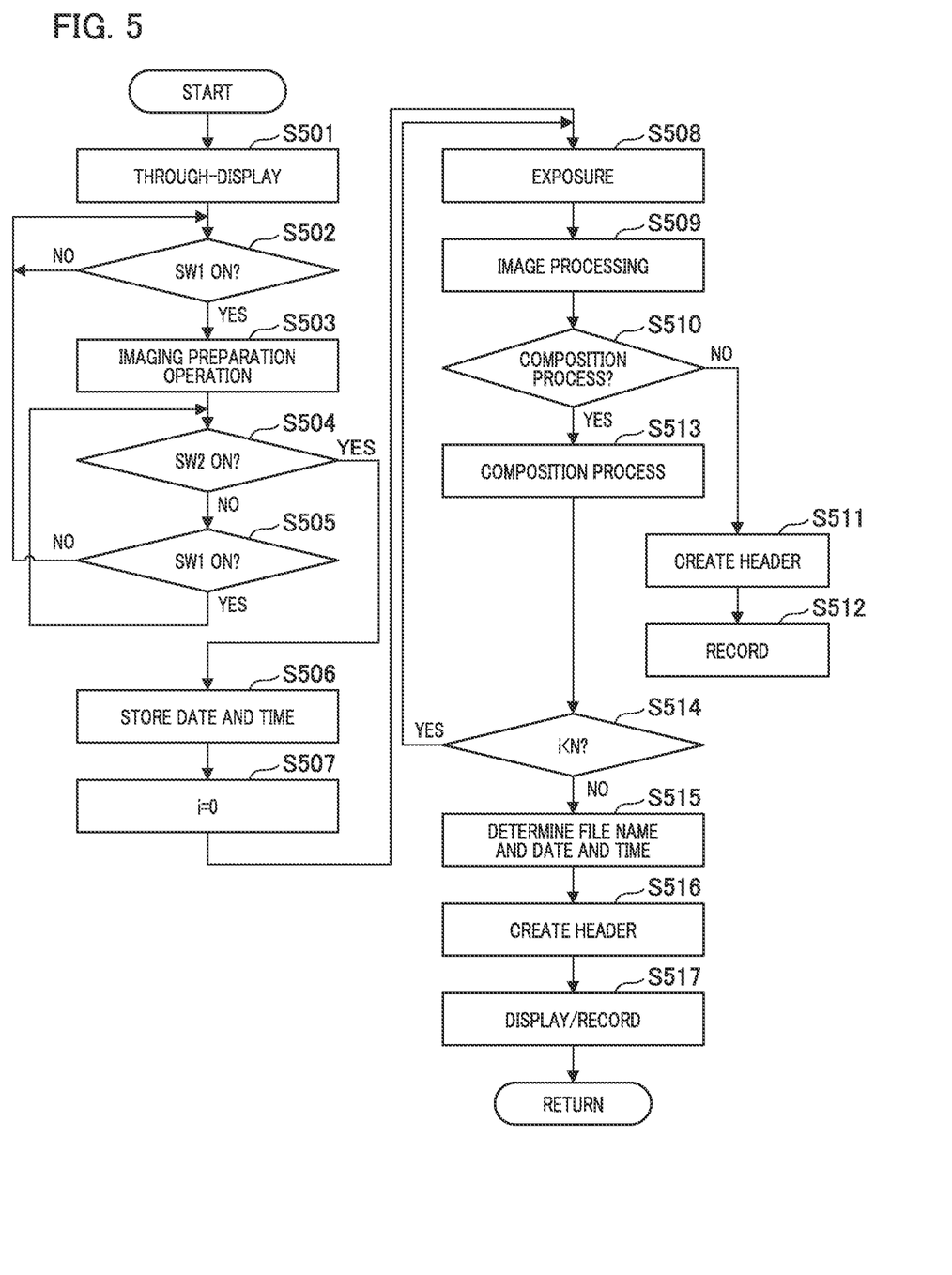
FIG. 5 is a flowchart corresponding to an imaging mode in the Embodiment.

FIG. 5 is a flowchart illustrating an imaging/recording process in the imaging apparatus 100 of the present Embodiment.

(Imaging Mode Process)

FIG. 5 is a flowchart illustrating details of the imaging mode process in step S403 in FIG. 4.

When the imaging mode is started, in step S501, the control unit 101 performs through-display of sequentially outputting captured images to the display unit 109 and sequentially displaying the captured images on the display unit 109.

In step S502, the control unit 101 determines whether or not a shutter switch SW1 has been pressed by the user. The control unit 101 proceeds to step S503 in a case where the shutter switch SW1 has been pressed, and waits for the shutter switch SW1 to be pressed in a case where the shutter switch SW1 has not been pressed. In step S503, the control unit 101 performs an imaging preparation operation. That is, distance measurement is performed to focus the imaging lens 103 on a subject, and light measurement is performed to determine an aperture value and a shutter time. The control unit 101 also sets an amount of light emitted from a strobe or the like as necessary on the basis of a light measurement result.

In step S504, the control unit 101 determines whether or not a shutter switch SW2 has been pressed by the user, and proceeds to step S506 in a case where the shutter switch SW2 has been pressed. In a case where the shutter switch SW2 has not been pressed, the control unit 101 proceeds to step S505 and determines whether or not the shutter switch SW1 is still pressed. In a case where the shutter switch SW1 is released, the process returns to step S502. If Yes in step S505, the process returns to step S504.

In step S506, the control unit 101 acquires the date and time when imaging is started from a real time clock (RTC) of the control unit 101 and stores the date and time into the RAM 103. Next, in step S507, a composition process flag i is set to 0.

Next, in step S508, the control unit 101 opens the shutter in the optical system 104 having a diaphragm function according to the aperture value according to the light measurement data stored in the RAM 103 or the ROM 102, and starts to expose the imaging sensor of the imaging unit 105.

In step S509, the control unit 101 outputs image data from the imaging unit 105, and then uses the image processing unit 107 to perform image processing such as a compression/coding process.

Thereafter, in step S510, the control unit 101 determines whether or not the set imaging mode is an imaging mode involving a composition process. That is, in step S401, the control unit 101 functions as a determination unit (acquisition unit) for determining (acquiring) an imaging mode or a composition method performed by the composition unit.

If the imaging mode is not an imaging mode involving a composition process, the process proceeds to step S511, and the image identification information 301 to be recorded in the header is determined to be the type data "1" indicating a normal image (non-composite image) and stored.

In this case, the control unit 101 functions as a type data generation unit for generating type data according to the type of composition associated with a setting of the imaging mode, for example.

As described above, the control unit 101 determines the type data ("1" as the image identification information 301) in a case where the image processing unit 107 does not perform composition. In step S512, the image data is recorded on the recording medium 108 together with the image data. In this case, the control unit 101 functions as a recording control unit for recording the type data corresponding to the type of composition in the APP1 (203), which is the header region based on the Exif standard, in association with the recorded image. After step S512, the process returns to step S501.

In a case where it is determined in step S510 that a composition process mode is set, the process proceeds to step S513, and composition is performed in a preset composition process mode. In this case, the control unit 101 functions as a composition unit for compositing a plurality of captured images according to a plurality of types of methods to generate a composite image. Next, in step S514, it is determined whether or not the number of captured images used for composition has reached the preset number N of images, and if not, the process returns to step S508 where a new exposure operation is performed.

If the number of images reaches N, a file name and the imaging date and time are acquired in step S515, and, in step S516, header information for recording the data and type data corresponding to the type of composition in the APP1 (203) as a header region is generated.

In step S516, the control unit 101 determines type data to be recorded in association with the image data according to the set imaging mode.

As described above, in a case where composition is performed by the composition unit, the control unit 101 generates one of at least two types of type data ("2" or "3" as the image identification information 301) according to the type of composition. An appropriate classification is determined from at least one of three types of type data, including a case where composition is performed by the image processing unit 107 and a case where the composition is not performed.

Next, in step S517, the control unit 101 displays an image on the display unit 109 and records the image on the recording medium 108. In this case, the control unit 101 functions as a recording unit for recording the type data in the APP1 (203), which is a header region based on the Exif standard, in association with the recorded image.

In this case, in a case where the type data is predetermined type data (image identification information is 3), at least "the number of captured images used for composition" and, for example, an exposure time and the like as "imaging conditions for the captured images used for composition" are recorded in the same region APP1 (203). After step S517, the process returns to step S501.

In the Embodiment, composition is executed every time exposure is finished, but a composition process may be performed after imaging is performed N times.

(Reproduction Mode Process)

Figure 6:
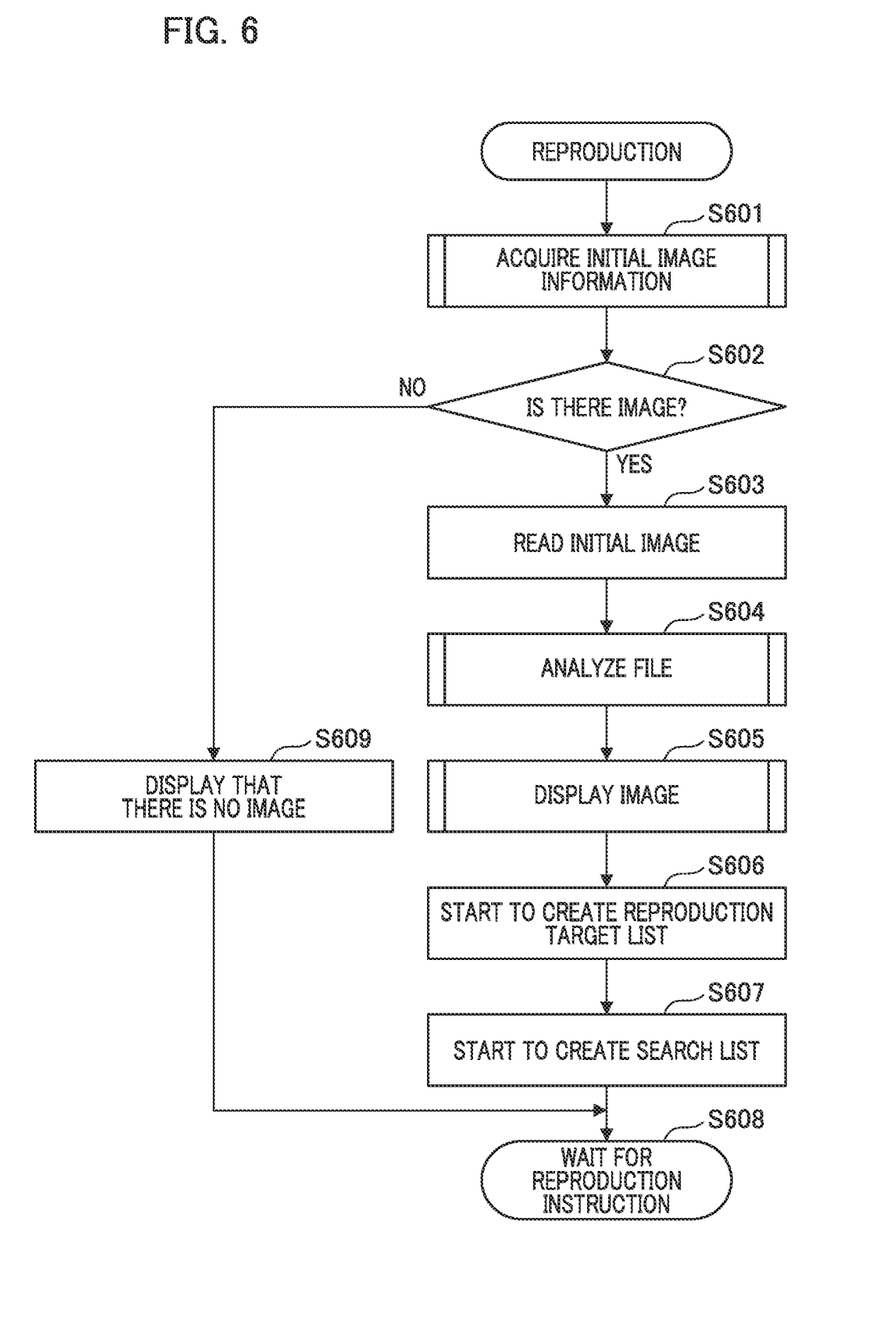
FIG. 6 is a flowchart corresponding to a reproduction mode in the Embodiment.

FIG. 6 is a flowchart illustrating details of the reproduction mode process in step S405 in FIG. 4.

The reproduction mode is started according to a reproduction instruction from the user via the mode switching switch. Alternatively, this flow is started in a case where the apparatus is powered on and started in a state in which the reproduction mode is set.

First, in step S601, the control unit 101 acquires initial image information from the recording medium 108.

This initial image is the latest image or the image displayed in the previous reproduction. Since the initial image information is acquired before calculating a total number of images or creating a search list, which will be described later, the initial image can be displayed as soon as the reproduction mode is started, and thus it is possible to prevent such a problem that nothing is displayed during a process such as calculating a total number of images.

In step S602, the control unit 101 determines whether or not the initial image information has been acquired correctly in step S601. This determination is performed because there is a case where there is no image or there is a case where image information cannot be obtained due to media defects. In a case where the initial image information can be obtained, it is determined that there is at least one image. In a case where there is an image, the process proceeds to step S603, and, in a case where there is no image, the process proceeds to step S609.

In step S603, the control unit 101 reads the initial image from the recording medium 108 on the basis of the initial image information acquired in step S601. In step S604, a file analysis process is performed, and the control unit 101 analyzes and acquires attribute information such as imaging information and composition information for the read initial image.

That is, in this case, the control unit 101 functions as an acquisition unit for acquiring the type data corresponding to the type of composition recorded in association with the recorded image, the information indicating the composition type, the number of captured images used for the composition, and the imaging conditions for the captured images used for the composition. It is checked whether or not the image data is corrupted.

In step S605, the control unit 101 displays the read initial image, and selectively displays attribute information such as imaging information and composition information together with the image as necessary. This selective display will be described later in FIG. 7. In a case where it is analyzed that the data is unauthorized such as a part of the file of the initial image being corrupted according to the file analysis result in step S604, the control unit 101 also displays an error.

In step S606, the control unit 101 starts to compute a total number of images recorded on the recording medium 108, and acquires the total number of images. This process is performed asynchronously with the image display process, and the flow may proceed to the next image display process without waiting for the completion. Through the in the above-described process, even in a case where many images are recorded on the recording medium 108 and it takes time to compute a total number of images, the images can be viewed.

In step S607, the control unit 101 analyzes all the images in the recording medium 108 and starts to create a search list as the search result. The search list is a list in which attribute information added to each image is acquired in advance and managed collectively. Since the search list is created, for example, it is possible to collectively set images having a certain attribute as reproduction targets or deletion targets.

In the same manner as in computation of a total number of images, the search list creation process is performed asynchronously with the image display process, and the next image display process is possible. In step S608, the control unit 101 proceeds to a state of waiting for the user's reproduction instruction.

In a case where there is no image in step S602, the control unit 101 proceeds to step S609, and performs display indicating that there is no image, for example, displays a message such as "there is no image" on the display unit 109, and proceeds to step S608.

(Screen Display)

Next, a method of displaying image data in the present Embodiment will be described. FIG. 7 is a diagram illustrating image list display examples in the Embodiment, and FIG. 7(A) illustrates an example of a screen displayed on the display unit 109 in a case where an image display application is operated in the present apparatus.

Figure 7A:
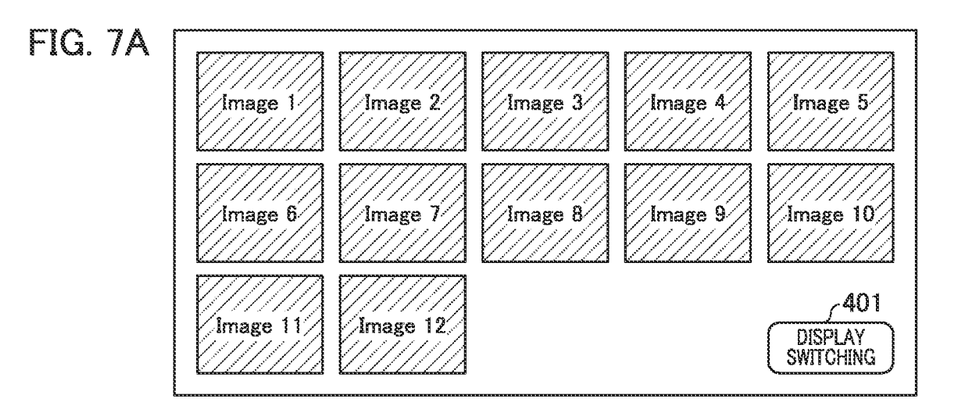
FIG. 7(A) illustrates a state in which image data Image 1 to Image 12 stored in the RAM 103 are displayed in a list form.

FIG. 7(A) illustrates a state in which image data Image 1 to Image 12 stored in the RAM 103 are displayed in a list form. These images are acquired from, for example, a digital camera or a mobile phone. The images may also be downloaded from a server or the like on a network. Thumbnails of the image data may be used instead of using the image data body. When a display switching button 401 is selected (touched) in the state illustrated in FIG. 7(A), the screen transitions to a screen in FIG. 7(B).

Figure 7B:
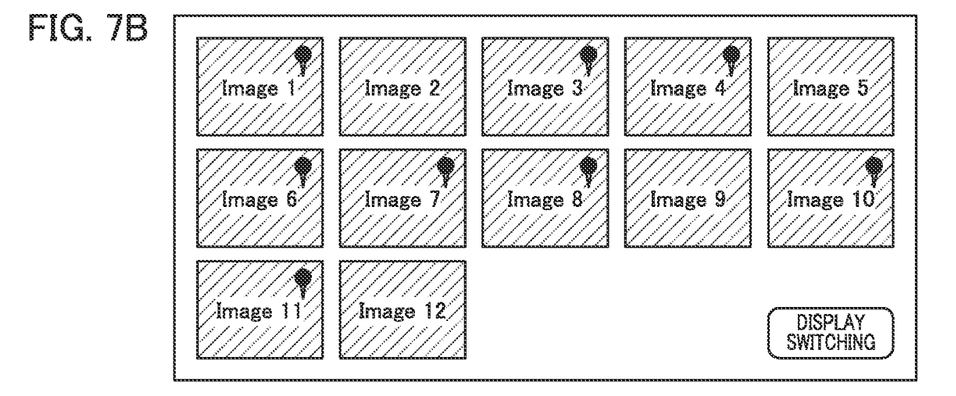
FIG. 7(B) is a screen displayed when a display switching button 401 is selected (touched) in the state illustrated in FIG. 7(A).

As illustrated in FIG. 7(B), for image data to which the composition-related information is added, an icon in the shape of a "pin" (hereinafter, a pin icon) is superimposed and displayed on the thumbnail of the image. That is, the pin icon is displayed for an image file having the composition-related information. The example of this screen illustrates that the image identification information 301 (for example, "1" to "3"), the composition type information 302, or the like is written as the composition-related information in Images 1, 3, 4, 6, 7, 8, 10, and 11.

Of course, the pin icon does not necessarily have to be completely superimposed on the thumbnail, and it is sufficient to distinguish between image files that have/do not have the composition-related information, and thus a part of the pin icon may be superimposed or may be displayed in the vicinity of the thumbnail of the image data without being superimposed thereon. In this screen, the pin icon is superimposed and displayed on the image data in which the composition-related information is written. A user can easily check which image data the composition-related information is added to by checking the screen.

Figure 7C:
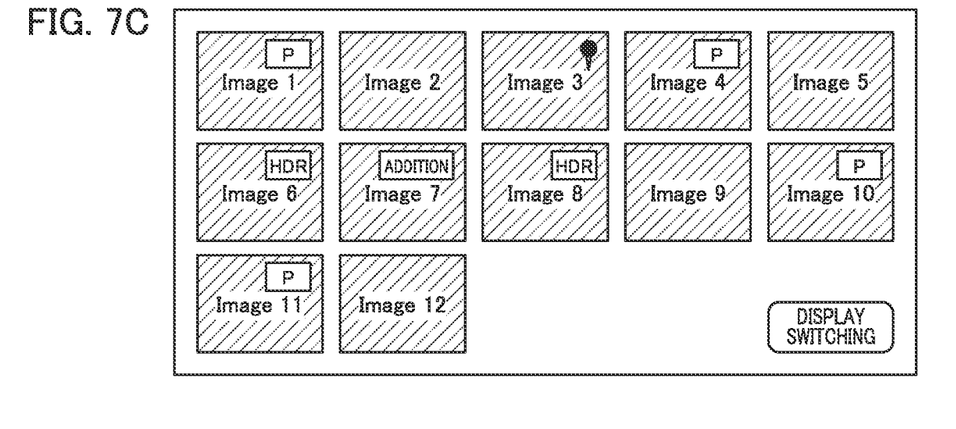
FIG. 7(C) is a screen displayed when the display switching button is further clicked in the state illustrated in FIG. 7(B).

When the display switching button is further clicked in the state illustrated in FIG. 7(B), the screen transitions to a screen in FIG. 7(C). As illustrated in the screen in FIG. 7(C), the pin icons hitherto are changed to icons or text corresponding to the image identification information 301 or the composition type information 302, and thus image identification information 301, the composition type information 302, or the like can be easily identified.

For example, for Images 1, 4, 10, and 11, "P" indicating panoramic composition or an icon indicating panorama is superimposed and displayed. This is because the composition type information 302 indicates that the composition type information 302 is panoramic composition, that is, composite image data is obtained by using the panoramic composition.

For Images 6 and 8, "HDR" indicating HDR composition or an icon indicating HDR is superimposed and displayed. This is because the composition type information 302 is indicates that image data is obtained by using the "HDR composition".

For Image 7, "addition" indicating addition composition or an icon indicating the addition composition is superimposed and displayed. This indicates that the composition type information 302 is the "addition composition", that is, image data is obtained by using the addition composition. The pin icon still remains in Image 3. This indicates image data in which the composition type information 302 is not written. In a case where the number of captured images used for composition or imaging conditions of the captured images used for composition are recorded on the recording medium in association with the recorded images, at least one of the two may be selectively displayable.

In particular, in a case where the type data is, for example, "3", the number of captured images used for composition or imaging conditions for the captured images used for composition are recorded on the recording medium in association with the recorded images.

As described above, in the screen in FIG. 7(C), text, an icon, or the like corresponding to the composition type information 302 is superimposed and displayed on the image data. Consequently, a user can easily check the composition type by which corresponding image data has been composited, the number of captured images, the imaging conditions for the captured images used for the composition, and the like.

When the display switching button is clicked on a display screen in FIG. 7(C), the screen changes to the screen in FIG. 7(A). That is, each time the display switching button is clicked, the above three types of display screens are switched in order.

In the above Embodiment, it is assumed that each time the display switching button 401 is operated, the display form is looped in the order of FIG. 7(A), FIG. 7(B), FIG. 7(C), and FIG. 7(A). However, one of the display types may be designated directly from the display menu, and display may be performed according to the selected display type.

At least one of the image identification information 301, the composition type information 302, the number-of-source-images information 303 that is the number of captured images used for composition, the composite image information 304, and imaging conditions for captured images such as source image information for a composite image may be displayed. A photographer's intention or ingenuity can be understood by viewing the information.

(Image Processing During Reproduction)

An operation in a case where the image processing unit 107 performs image processing at the time of reproducing an image will be described. For example, it is assumed that the control unit 101 reads image data from the ROM 102 or the recording medium 108 and displays an image on the display device of the display unit 109. In that state, in response to an image processing instruction from a user via the operation unit 111, the image processing unit 107 receives the image data corresponding to the image displayed on the display unit 109 and performs image processing. Here, the control unit 101 rewrites header information of the image data that is a target of the image processing according to the image processing performed by the image processing unit 107.

Specifically, a case is assumed in which image processing performed on the basis of a pixel value of image data that is a target of processes such as a gradation conversion process, a color conversion process, a defect correction process, and a filtering process is performed on image data in which "3" is stored in the image identification information 301 of an image file.

In that case, the control unit 101 also stores "3" indicating a composite image acquired at the time of imaging as the image identification information 301 in an image file that stores processed image data. In contrast, a case is assumed in which image processing involving some kind of composition process with other source images or composition processes such as text data, frames, icons, or CG are performed on image data in which "3" is stored as the image identification information 301 of an image file.

In that case, the control unit 101 stores "2" indicating a general composite image as the image identification information 301 in an image file that stores processed image data. The control unit 101 is operated as described above, and thus the reliability of the information of the composite image "3" acquired at the time of imaging can be ensured in the system. Further, the control unit 101 also stores "2" indicating a general composite image as the image identification information 301 in an image file that stores processed image data for image data in which "2" is stored as the image identification information 301 of the image file, regardless of which of the above image processing is performed.

A case is assumed in which image processing corresponding to a process classified as "2" or "1" in each of the above imaging modes is performed on image data in which "1" is stored as the image identification information 301 of the image file. In that case, the control unit 101 determines the image identification information 301 corresponding to the processed image data according to the above classification. That is, the control unit 101 determines whether or not the image processing performed on a reproduced image is composition and a composition process method.

On the basis of a determination result, the image identification information 301 to be recorded in an image file that stores processed image data is determined, and is recorded in the composition information section 2091 of the image file including the processed image data. In a case where image processing performed on the basis of a pixel value of image data that is a target of other processes such as the gradation conversion process, the color conversion process, the defect correction process, and the filtering process is performed, "1" indicating a non-composite image is also stored as the image identification information 301 in the image file that stores the processed image data.

As described above, in the present Embodiment, information stored in the composition information section 2091 is recorded together with the image data, and thus a user or a computer can appropriately determine an image according to the presence or absence or the type of composite processing. For example, it is possible to collect image files including images obtained through HDR composition, analyze information recorded in the composition information section 2091 with AI or the like, and learn various imaging conditions or the like.

A scene or compositional arrangement can be used as reference information for learning an exposure difference, and an exposure time or ISO of a material image can also be utilized for that purpose.

For the starry sky trajectory imaging, a relationship between an imaging time and a trajectory can be predicted on the basis of a tag indicating a total exposure period including an exposure time of each captured image and a non-exposure period between respective captured images during imaging, attached to a composite image. Consequently, it is not necessary to set an imaging time unnecessarily long.

In a case where a camera is used for learning, information indicating a composition failure (for example, in a case where the camera determines a failure during imaging, a case where a cloud side determines a failure, or a case where a user determines a failure and gives a bad rating) is recorded in a file. The information can be used for the next imaging conditions.

For example, if a cause of the failure is considered to be camera shake, a user is regarded as prone to camera shake, and improvement such as setting an exposure time automatically determined by the control unit 101 to a shorter time in the next and subsequent imaging can be made.

When image processing is performed with an application or the like on a composited JPEG image used for determining image processing parameters of a composite image, the information in the composition information section is referred to.

In an application that stores NR parameters for each ISO sensitivity and applies the parameters according to the captured ISO sensitivity, a logic for determining the parameters can be changed in a case of a composite image.

For example, in a case of a non-composite image of ISO3200, parameters of ISO3200 are used, in a case of a composite image of ISO3200X2, parameters of ISO2500 are used, and in a case of a composite image of ISO3200X4, parameters of ISO1600 are used. In the above-described way, the parameters can be switched according to the number of composite images and an ISO sensitivity of a source image.

The composition information section 2091 is embedded in the data of the imaging conditions in the APP1 of the Exif structure, and thus it is possible to achieve high compatibility with existing Exif-compliant devices and software.

(Other Embodiments)

The present invention is not limited to the above Embodiments, and various modifications can be made on the basis of the spirit of the present invention, and these are not excluded from the scope of the present invention.

A computer program that realizes the above functions of the above Embodiments by executing some or all of the types of control in the present Embodiment may be supplied to an image processing apparatus or the like via a network or various storage media. A computer (or a CPU, an MPU, or the like) in the image processing apparatus or the like may read and execute the program. In that case, the program and a storage medium that stores the program constitute the present invention.

This application claims the benefit of Japanese Patent Application No. 2019-49006, filed Mar. 15, 2019 and Japanese Patent Application No. 2019-49142, filed Mar. 15, 2019, which are hereby incorporated by reference herein in its entirety.

What is claimed is:

1. An image processing apparatus comprising:
at least one processor or circuit configured to function as:
a composition unit configured to composite a plurality of captured images to according to a plurality of types of methods to generate a composite image;
a recording unit configured to record the captured images or the composite image as a recorded image in a recording unit;
a type data generation unit configured to generate type data including a first type data and a second type data according to the type of composition performed by the composition unit; and
a reproduction unit configured to reproduce a recorded image from a recording medium on which a captured image or a composite image is recorded;
wherein the recording unit has a first image taking mode in which imaging conditions and an angle of view for a plurality of images used for generating a first composite image during imaging are substantially identical, and a second image taking mode in which one of the imaging conditions and the angle of view for the plurality of images used for generating a second composite image is substantially different, wherein the recording unit records a first type data in association with the first composite image in the first image taking mode, and the second type data in association with the second composite image in the second image taking mode, wherein when the reproduction unit reproduces the first composite image and when the composition unit composites another image with the first composite image, the recording unit rewrites the first type data recorded in association with the first composite image to the second type data.

2. The image processing apparatus according to claim 1, wherein the at least one processor or circuit is further configured to function as a determination unit and the determination unit determines the imaging mode corresponding to the plurality of captured images on the basis of the imaging mode that is set in advance when the plurality of captured images are generated.

3. The image processing apparatus according to claim 1, wherein the at least one processor or circuit is further configured to function as a recording control unit, in a case where the type data is predetermined type data, the recording control unit records at least the number of captured images used for the composition and imaging conditions for the captured images used for the composition in association with the recorded image.

4. The image processing apparatus according to claim 1, wherein the at least one processor or circuit is further configured to function as a recording control unit, in a case where the composition is performed by the composition unit, the recording control unit generates one of at least two types of type data according to the type of the composition.

5. The image processing apparatus according to claim 4, wherein the recording control unit generates first type data in a case where imaging conditions and an angle of view for a plurality of images used for the composition during imaging are identical, and generates second type data in a case where one of the imaging conditions and the angle of view for the plurality of images used for the composition is different.

6. The image processing apparatus according to claim 1, wherein the at least one processor or circuit is further configured to function as a recording control unit, and the recording control unit generates third type data in a case where the plurality of captured images are not composited by the composition unit.

7. The image processing apparatus according to claim 1, wherein the at least one processor or circuit is further configured to function as a recording control unit and the recording control unit records the type data in a header region of an image data file.

8. The image processing apparatus according to claim 7, wherein the recording control unit records the type data in an APP1 region of an image data file based on an Exif standard.

9. The image processing apparatus according to claim 1, further comprising:
an imaging unit for generating the plurality of captured images.

10. The image processing apparatus according to claim 1, further comprising:
a display unit for being capable of selectively displaying at least one of the number of captured images used for the composition and imaging conditions for the captured images used for the composition.

11. An image processing method comprising:
a composition step of compositing a plurality of captured images according to a plurality of types of methods to generate a composite image;
a recording step of recording the captured images or the composite image as a recorded image;
a type data generation step of generating type data including a first type data and a second type data according to the type of composition performed by the composition step; and
a reproduction step of reproducing a recorded image from a recording medium on which a captured image or a composite image is recorded;
wherein the recording step is performed in a first image taking mode in which imaging conditions and an angle of view for a plurality of images used for generating a first composite image during imaging are substantially identical, or a second image taking mode in which one of the imaging conditions and the angle of view for the plurality of images used for generating a second composite image is substantially different,
wherein the recording step records a first type data in association with the first composite image in the first image taking mode, and the second type data in association with the second composite image in the second image taking mode,
wherein when the reproduction step reproduces the first composite image and when the composition step composites another image with the first composite image, the recording step rewrites the first type data recorded in association with the first composite image to the second type data.

12. A non-transitory computer-readable storage medium configured to store a computer program to control an image processing apparatus, wherein the computer program comprises instructions for executing following processes:
a composition step of compositing a plurality of captured images according to a plurality of types of methods to generate a composite image;
a recording step of recording the captured images or the composite image as a recorded image;
a type data generation step of generating type data including a first type data and a second type data according to the type of composition performed by the composition step; and
a reproduction step of reproducing a recorded image from a recording medium on which a captured image or a composite image is recorded;
wherein the recording step is performed in a first image taking mode in which imaging conditions and an angle of view for a plurality of images used for generating a first composite image during imaging are substantially identical, or a second image taking mode in which one of the imaging conditions and the angle of view for the plurality of images used for generating a second composite image is substantially different,
wherein the recording step records a first type data in association with the first composite image in the first image taking mode, and the second type data in association with the second composite image in the second image taking mode,
wherein when the reproduction step reproduces the first composite image and when the composition step composites another image with the first composite image, the recording step rewrites the first type data recorded in association with the first composite image to the second type data.

* * * * *